April 26, 1966  J. NEMETH ETAL  3,247,654
ROTARY MOWER BLADE HEIGHT ADJUSTMENT AND CLUTCH APPARATUS
Filed Jan. 15, 1964  2 Sheets-Sheet 2

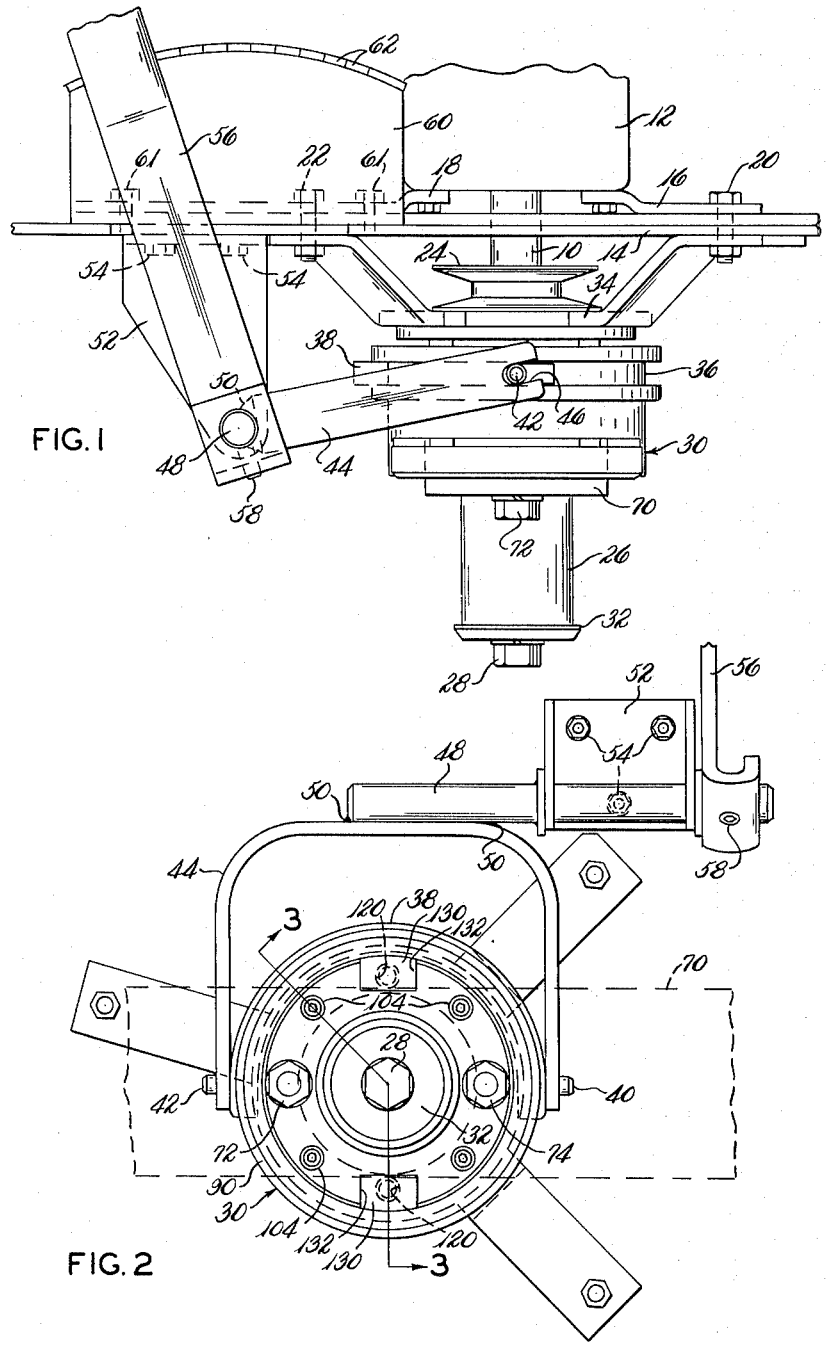

INVENTORS
JOSEPH NEMETH
HARRY MULDER
BY
Oldham & Oldham
ATTYS.

United States Patent Office 3,247,654
Patented Apr. 26, 1966

3,247,654
ROTARY MOWER BLADE HEIGHT ADJUSTMENT AND CLUTCH APPARATUS
Joseph Nemeth, 6452 Manchester Road, Clinton, Ohio, and Harry Mulder, 2060 Sycamore St., Akron 19, Ohio
Filed Jan. 15, 1964, Ser. No. 337,830
9 Claims. (Cl. 56—25.4)

This invention relates to a rotary mower blade adjusting and clutch apparatus, and more particularly to an apparatus allowing vertical adjustment of the blade in a rotary mower and a clutch action between the blade and the motor when the blade is moved to the extreme upward vertical position.

Heretofore, it has been known that rotary lawn mowers have been in extensive use. These mowers come in various embodiments such as one where the motor drives only the blade and the mower is pushed by hand over the area desired to be mowed. Another embodiment utilizes power from the motor to drive the wheels as well as the cutting blade so that the mower is self-propelled. A modification of the self-propelled mower is one where the operator sits on a trailer attachment and the entire unit is self-propelled. Heretofore it has not been possible to readily adjust the height of the mower blade in relation to the wheels to vary the lengths to which the grass is cut. Also, clutching arrangements between the motor drive and the rotary blade have been difficult to achieve because the drive is usually direct which prohibits utilization of conventional clutching techniques. A clutching apparatus between the drive motor and the blade is particularly desirable where the mower is to be moved for considerable distances without cutting while the motor is running as well as from moving over uneven areas or stony areas where the blade could hit some hard protruding object if the blade was still running while the mower was traversing this area. A quick and easily adjustable blade grass cutting height feature as well as clutching between the drive motor and the cutting blade in a rotary mower is needed.

Therefore, it is the general object of the present invention to avoid and overcome the difficulties and objections to the prior art by providing an apparatus to quickly and readily adjust the height of the cutting blade in a rotary mower, and which apparatus further includes a clutching feature between the drive motor and the rotary blade when the blade is moved to the extreme upward vertical position.

A further object of the invention is to provide a clutch assembly where spring means are utilized to engage the clutch when it is desired for the cutting blade to rotate, and which same spring means are utilized to assist in engagement of a brake means to stop the cutting blade from rotation when the clutch is disengaged.

A further object of the invention is to provide an apparatus readily mountable to the rotating shaft of the drive motor on a rotary mower which apparatus is vertically adjustable to provide vertical adjustment to a cutter blade mounted thereto and which apparatus quickly and easily achieves a clutching action between the driving shaft and the cutting blade when the apparatus is moved to the extreme vertically upward position.

Another object of the invention is to provide a clutching and vertically adjustable apparatus for ready assembly to the drive shaft of a rotary lawn mower whereby a conical clutching arrangement is utilized with one portion splined to the shaft but movable vertically thereon and the other portion rotatable therearound, but held in journalled relationship at both ends when the clutch is engaged, and wherein a unique splined engagement of the rotatable member is achieved to prevent damage if the blade strikes a hard object during its rotation.

The aforesaid objects of the invention and other objects which will become apparent as the description proceeds are achieved by providing in a clutch and vertically adjustable apparatus for a rotary lawn mower the combination of a frame, a rotatable shaft received in fixed relation through the frame, a clutch assembly slidably mounted on the shaft which assembly comprises, a conically shaped clutch member longitudinally slidable and non-rotatably mounted on the shaft, a clutch body longitudinally slidable and rotatably received on the clutch member and having a conically shaped inner surface adapted to engage the conically shaped surface of the clutch member, a brake shoe mounted in longitudinally slidable and non-rotatable relation to the clutch body and in a rotatable but longitudinally fixed relationship with the clutch member, spring means urging the clutch body away from the brake shoe, brake plate means operatively affixed to the frame and adapted to be positioned adjacent the brake shoe, and means adapted to engage the clutch body to slide the clutch assembly longitudinally on the shaft whereby when the clutch body is moved to its limit towards the brake plate means the brake plate means and the brake shoe contact thereby compressing the spring means and moving the clutch body out of engagement with the clutch cone.

For a better understanding of the invention reference should be had to the accompanying drawings wherein:

FIGURE 1 is a front elevational view of a vertically adjustable clutch assembly comprising one embodiment of the invention which shows the relationship of the drive motor, drive shaft, and adjusting means for the assembly;

FIGURE 2 is a plan view looking from the bottom towards the assembly and particularly showing the relationship of the adjusting means;

Figure 3:
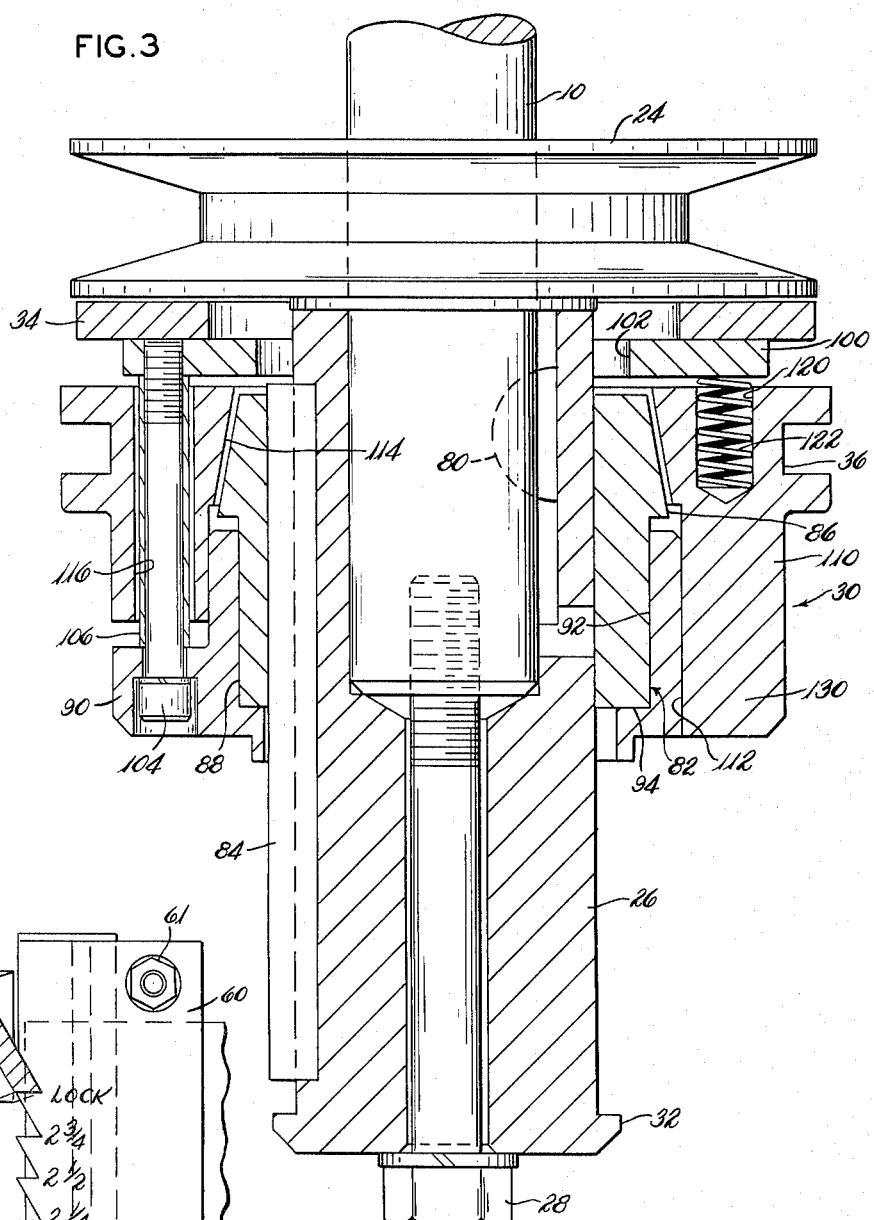
FIGURE 3 is an enlarged vertical cross sectional view of the clutch assembly taken on line 3—3 of FIGURE 2.

While the vertically adjustable clutch assembly of the invention might be utilized on any assembly where vertical adjustment or longitudinal movement of a clutch assembly on a shaft were desired with clutching features achieved when the assembly was moved to one extreme, the assembly is particularly adaptable to a rotary lawn mower where it is desired to adjust the vertical position of the cutting blade and where clutching action is desired at the highest vertical movement of the blade, and hence the invention has been so illustrated and will be so described.

With reference to the form of the invention illustrated in FIGURE 1 of the drawings, the numeral 10 indicates the vertical drive shaft of an engine 12 which engine is mounted to a bed or mower frame 14 for a rotary type lawn mower (not shown) by means of brackets 16 and 18 and bolts 20 and 22, respectively. The shaft 10 passes in rotatable relation through the frame 14 and may carry a V-belt pulley 24 for driving the wheels of the mower to make it self-propelled.

A substantially cylindrical extension member 26 is slidably received over the end of the shaft 10, and is held in place thereto by a bolt 28, as will be more fully described with reference to FIGURE 3 hereinafter. A clutch assembly, indicated generally by numeral 30, is slidably mounted on the extension member 26. A protruding flange 32 on the extension member 26 provides a bottom extension limit for the assembly 30, and a brake plate 34 operatively affixed to the frame 14 by the bolts 20 and 22 provides an upward extension limit for the assembly 30. In order to provide vertical movement for the assembly 30 on the extension member 26, a circumferential groove 36 is provided to receive a U-shaped yoke member 38 which mounts a pair of opposed trunnions 40 and 42, respectively, as best seen in FIGURE 2. A bifurcated lever 44 having slotted ends 46, as seen in FIGURE 1, operatively engages with the trunnions 40 and 42. In order to provide movement to the lever 44, a shaft 48 is operatively affixed thereto, as by welding at 50. The shaft 48 is rotatably mounted through a supporting frame 52 which frame 52 is operatively affixed to the frame 14 of the mower in some convenient manner such as by bolts 54. As a means of rotatable actuation for the shaft 48, a lever 56 has one end fixedly secured thereto, as by set screw 58. Thus, lever 56 rotates shaft 48 which causes lever 44 to position the assembly 30 vertically on the extension member 26. In order to hold the lever 56 in a desired adjusted position, a frame 60 is operatively mounted to the mower frame 14 by convenient means such as bolts 61, and the lever 56 is held in position on a plurality of notches, indicated generally by numeral 62, as clearly seen in FIGURE 4. Note that the lever 56 contains a partial twist so that it conveniently fits into the notches 62. It should be further noted, with reference to FIGURE 4, that the notches 62 identify the height to which the mower blade will be positioned by the adjustment of the lever 56.

It is contemplated that a mower blade 70 will be mounted by bolts 72 and 74 to the clutch assembly 30. The cutter blade 70 is shown in dotted lines in FIGURE 2 so the clarity of the assembly is preserved. It should be noted also with the reference to FIGURE 2 that the brake plate 34 is mounted to the mower frame 14 by three extending arms.

Now, with reference to FIGURE 3, the essence of the operation and construction of the clutch assembly 30 will be described. Particularly, however, the relationship of the extending member 26 as secured to the shaft 10 by bolt 28 should be seen by the cross sectional view. Note that the member 26 is also keyed to the shaft 10 by convenient means, such as Woodruff key 80, to prevent rotation of the extending member 28 in relation to the shaft 10. A clutch cone 82, preferably made of bronze or some softer metal, is slidably received over the extended member 26, and held from rotational movement thereon by an elongated key 84. Thus, it is an important feature of the invention that the cone clutch 82 is longitudinally slidable on the extended member 26, but cannot rotate therearound. In order to facilitate the operation of the clutch, the cone clutch 82 contains a conically shaped outer surface 86 at its top end and a journalled outer surface 88 at its bottom end.

A substantially cylindrically machined steel pilot member 90, having a cylindrical bore 92, has the bore 92 slidably and rotatably received over the journalled outer surface 88 of the cone clutch 82. The bore 92 of the pilot member 90 terminates in a shoulder 94 which is adapted to abut the end of the journalled outer portion 88 of the cone clutch 82. Thus, the longitudinal movement of the pilot member 90 in relation to the cone clutch 82 is limited by the abutment of the shoulder 94 against the end of the journalled outer portion 88. Note that the longitudinal length of the bore 94 does not allow the end of the pilot member 90 to hit the conical portion 86 of the cone clutch 82. It is also an important feature of the invention that the bore 92 closely fit over the journalled portion 88 to provide a bearing fit to achieve a firm support for one end of the assembly 30 to insure that the cutter blade 70, which is attached by bolts 72 and 74 to the pilot member 10, will run in a true horizontal wobble.

A flat washer-like brake shoe 100 having a centrally aligned hole 102 is operatively positioned with considerable clearance over the extended portion 26, and is affixedly attached to the pilot member 90 by suitable means such as a plurality of socket head screws 104. The brake shoe 100 is held in spaced relationship from the pilot member 90 by sleeves 106 loosely fitting around the screws 104, but maintaining the spaced distance between the brake shoe 100 and the pilot member 90 when the screws 104 are tightened. As seen in FIGURE 2, four screws 104 are utilized to maintain the spaced fixed relationship between these members. The screws 104 do not pass through the brake shoe 100, but screw through most of the thickness thereof to secure the spaced fixed relationship.

As an important constructional feature of the invention, a clutch body 110 having a circular bore 112 extending partially therethrough and a conically tapered inward portion 114 is provided to slidably fit over the sleeves 106 so the bore 114 fits over the outer bearing surface of the pilot member 90 and the conically tapered surface 114 substantially corresponds and is adapted to communicate with the conically tapered surface 86 of the cone clutch 82. The invention contemplates that a plurality of holes 116 are provided through the clutch body 110 at properly spaced relationships to allow the body 110 to slidably fit over the sleeves 106. It is contemplated that the clutch body 110 will be made from cast iron or similar material so that a good friction relationship can be obtained between the conically tapered surfaces 114 and 86 to provide a proper clutching friction action.

As an important feature of the construction of the clutch assembly 30, the clutch body 110 is provided with four bores 120, positioned in adjacent relationship to the brake shoe 100 at equally spaced distances between the screws 104. Only two of the bores 120 are shown in dotted lines in FIGURE 2 as the other bores are hidden by the bolts 72 and 74. Helical coiled spring means 122 are carried by the bores 120 which effectually bias the clutch body 110 away from the brake shoe 100 towards the pilot member 90 to cause the conically tapered surfaces 114 and 86 to be urged into contact. The importance of this spring biasing relationship will be more fully described and understood with reference to the operation description hereinafter.

As a further important feature of the invention, a pair of extending ears 130 from the clutch body 110 slidably engage slots 132 in the pilot member 90, as seen in FIGURE 2. Thus, although the clutch body 110 is longitudinally slidable in relation to the pilot member 90, it is held in a fixed rotational relationship because of the ears 130 engaging the slots 132. The purpose of this construction is to relieve rotational stresses from being absorbed by the screws 104 when the cutter blade 70 hits something solid during the cutting operation.

*Operation*

Figure 4:
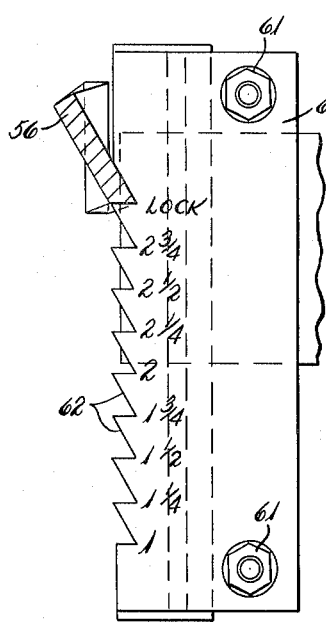
FIGURE 4 is a plan view of the holding means for the adjusting lever illustrating the various vertical positions available as well as the clutching position.

FIGURE 3 illustrates the clutch assembly 30 in the extreme upward position, or the lock position shown in FIGURE 4. In this position, the clutch is disengaged as the lever 44 operating through the U-shaped yoke 38 engaging the groove 36 has forced the clutch body 110 vertically upwardly until the brake shoe 100 has engaged the brake plate 34. At this point the springs 122 compress allowing the clutch body 110 to move upwardly and break the clutch contact between the tapered surfaces 86 and 114. This total upward movement to break the tapered surfaces 86 and 114 after the brake shoe 100 has engaged the brake plate 34 is usually not more than 1/16 inch as a very small clearance is necessary to effect the de-clutching action. Thus, sufficient clearance is maintained between the brake shoe 100 and the clutch body 110 during the operating position so that the clutch body 110 can move upwardly to effect the de-clutching action. It should be noted that when the clutch body 110 is moved to this upward position and held in place by the lever 56 the springs 122 act only against the brake shoe 100 forcing it harder against the brake plate 34 which will cause an almost immediate stoppage of rotation of the cutter blade 70 as the rotation of the clutch assembly 30 is stopped by the braking action between the brake shoe 100 and the stationary brake plate 34. Thus, in this de-clutched position the only relative movement with the motor running is between the journalled outer bearing surface 88 of the cone clutch 82 and the bore 92 of the pilot member 90. The shoulder 94 of the pilot member 90 will ride lightly against the end of the cone clutch 82 because of the spaced relationship maintained between the brake shoe 100 and the pilot member 90 by means of the spacers 106. Thus, no heat generation problems or undue friction is in effect during the de-clutched condition.

In order to start the cutter blade 70, the lever 56 is moved to one of the other notches 62 to position the blade at the grass cutting height desired. As soon as this action moves the clutch body 110 downwardly about 1/16 of an inch the tapered surfaces 86 and 114 come into engagement and the brake shoe 100 and brake plate 34 come out of engagement to allow the spring means 122 to urge the clutch body into engaging operation. Thus, after only approximately 1/16 inch downward movement the rotation of the clutch assembly 30 is achieved and further slidable positioning thereof is possible to adjust the cutter blade 70 to the desired height. Upon vertical positioning the cone clutch 82 simply slides longitudinally on the extended member 26 with the maximum downward extension limited by the flange 32. It should be understood that once the tapered surfaces 86 and 114 have been brought into engagement by the urging of the springs 122 that there will be no excessive frictional pressures created between the U-shaped yoke 38 and the groove 36 since the bias merely urges the tapered surfaces 86 and 114 together to achieve the clutching action at the vertical level determined by the yoke 38. This is due to the tapered conical construction and the fact that the clutch body 110 is slidably mounted between the brake shoe 100 and the pilot member 90.

As was mentioned previously, the bearing relationship between the journal surface 88 and the bore 92 provides a central stabilization to the bottom of the clutch assembly 30. The tapered axially aligned relationship of the conical surfaces 86 and 114 provides a stabilization at the top end of the clutch assembly 30. Thus, with these stabilizations at both ends the assembly 30 runs true allowing the cutter blade 70 to run in the true horizontal without wobble.

It is seen that a unique clutching arrangement and vertically adjustable clutching assembly has been provided whereby spring means are utilized to either engage the clutch for grass cutting operations, or help engage the brake for de-clutching operation. Further, the combination is so arranged that no excessive frictional forces are present during cutting or de-clutching operation which might overheat the assembly. The assembly is properly aligned and has support at both ends during cutting operation so as to eliminate any chance of cutter blade wobble. The assembly is readily adjustable during the operation of the motor to vertically adjust the cutting level of the blade as well as to provide a de-clutching action at the extreme upward vertical position. This allows, for example, a structure in which the rotary blade can be raised up out of the way and held stationary when the mower is started in the barn, with the mower being driven to the place where it is to be used with the blade then being moved downwardly and energized to rotary motion for operation.

The assembly is readily attachable to any rotary mower without special structure or apparatus as the mounting bolts for the mower motor are utilized as well as the mower supporting frame. The unique rotational inner locking between the clutch body 110 and the pilot member 90 eliminates the possibility of breakage of the screws 104 because of excessive rotational torques caused upon starting or when the cutter blade hits some solid object during cutting operation.

While in accordance with the patent statutes one best known embodiment of the invention has been illustrated and described in detail, it is to be understood that the invention is not limited thereto or thereby, but that the inventive scope is defined in the appended claims.

What is claimed is:

1. The combination in a rotary blade mower, or the like, of
   a frame,
   a rotatable shaft received through the frame,
   a clutch assembly slidably mounted on said shaft, said assembly comprising
      a conically shaped clutch member longitudinally slidably and non-rotatably received on said shaft,
      a clutch body longitudinally slidably and rotatably received on said clutch member and having a conically shaped inner surface adapted to engage the conically shaped surface of said clutch member,
      a brake shoe mounted in longitudinally slidable and non-rotatable relation to said clutch body and in a rotatable but longitudinally fixed relationship with said clutch member, and
      spring means biasing said clutch body away from said brake shoe to urge said conically shaped inner surface of said clutch body into engagement with the conically shaped surface of said clutch member,
   brake plate means operatively affixed to said frame and adapted to be positioned adjacent said brake shoe, and
   means adapted to engage said clutch body to slide said clutch assembly longitudinally on said shaft whereby when said clutch body is moved to its limit towards said brake plate means, said brake plate means and said brake shoe contact thereby compressing said spring means and moving said clutch body out of engagement with said clutch member.

2. In a clutch and blade adjustment assembly for a rotary type lawn mower the combination of
   a frame,
   a rotatable shaft passing through the frame,
   a clutch assembly slidably mounted for longitudinal movement on said shaft which assembly comprises
      a clutch cone having one end with an outer conically shaped surface received in longitudinal sliding non-rotatable relation on said shaft,
      a pilot member received in longitudinal sliding and rotatable relation on said clutch cone,
      a clutch body received in longitudinal sliding and non-rotatable relation on said pilot member, said clutch body having an inner conically shaped surface adapted to engage the outer conically shaped surface of said clutch cone in a friction clutch relationship,
      a brake shoe operatively mounted in fixed spaced relation to said pilot member so as to be substantially adjacent to one end of said clutch body with said clutch body between said brake shoe and said pilot member, and
      spring means adapted to bias said clutch body away from said brake shoe towards said pilot member so as to urge into engagement said inner conically shaped surface of said clutch body with said outer conically shaped surface of said clutch cone,
   non-rotatable brake plate means mounted in fixed relationship to said frame in substantially adjacent relationship to said brake shoe,
   means adapted to engage said clutch body to move said clutch assembly longitudinally in relation to said shaft whereby when the clutch body is moved to its limit towards said brake plate means the brake plate means and said brake shoe contact thereby compressing said spring means and moving said clutch body out of engagement with said clutch cone, and cutter blade means operatively affixed to said pilot member.

3. In a blade adjustment and clutch apparatus for a rotary type lawn mower the combination of a frame having an opening therethrough, a motor operatively mounted to the frame, a shaft adapted to be rotatably driven by said motor extending through said opening in said frame in substantially perpendicular relation thereto, an extension member slidably engaging the end of said shaft and operatively secured in fixed axially aligned relation thereto, a clutch cone received on said extension member substantially coaxial therewith and adapted for relative longitudinal movement, said clutch cone having a bearing surface at its bottom end and conically tapered surface at its top end, a pilot member slidably received in axial alignment over the bearing surface at the bottom end of said clutch cone and adapted for rotary movement thereabout, a brake shoe slidably received over said extension member, screw and spacer sleeve means operatively mounting said brake shoe in fixed spaced relationship to said pilot member, a clutch body slidably received on said screw and spacer sleeve means between said brake shoe and said pilot member and having a conically shaped radially inner surface adapted for complimentary engagement with the conically shaped outer surface at the top end of said clutch cone, said clutch body having a circumferentially extending groove on the outer surface thereof and having extending lugs adapted to engage receiving slots in said pilot member to prevent relative rotation therebetween, spring means operatively mounted in said clutch body and adapted to bias said clutch body away from said brake shoe and into engagement with said clutch cone, brake plate means operatively affixed to said frame and having a surface thereof adapted to engage a surface of said brake shoe for friction braking action therebetween, means engaging the groove on said clutch body adapted to move said clutch body longitudinally in relation to said extension member whereby when said clutch body is moved to its limit towards said brake plate means the brake plate means and said brake shoe contact thereby compressing said spring means and moving said clutch body out of engagement with said clutch cone, and cutter blade means operatively affixed to said pilot member.

4. In a rotary mower the combination of a frame, a rotatable shaft received through the frame, a clutch assembly slidably mounted on said shaft, said assembly comprising a conically shaped clutch member longitudinally slidably and non-rotatably received on said shaft, a clutch body longitudinally slidably and rotatably received on said clutch member and having a conically shaped inner surface adapted to engage the conically shaped surface of said clutch member, and spring means urging said conically shaped inner surface of said clutch body into engagement with the conically shaped surface of said clutch member, means adapted to engage said clutch body to slide said clutch assembly vertically on said shaft whereby when said clutch body is moved to its upward limit said spring means are compressed thereby moving said conically shaped inner surface of said clutch body out of engagement with the said conically shaped surface of said clutch member, and cutting means carried by the clutch assembly.

5. In a clutch and blade adjustment assembly for a rotary type lawn mower the combination of a frame, a rotatable shaft passing through the frame, a clutch assembly slidably mounted for longitudinal movement on said shaft which comprises a clutch cone received in longitudinal sliding non-rotatable relation on said shaft, a clutch body received in longitudinal sliding and rotatable relation on said clutch cone, said clutch body adapted to engage said clutch cone in a friction clutch relationship, and spring means adapted to urge said clutch cone and said clutch body into engagement, means adapted to engage said clutch body to move said clutch assembly longitudinally in relation to said shaft, and to compress said spring means to move said clutch body out of engagement with said clutch cone, and cutter blade means operatively affixed to said clutch assembly.

6. In a blade adjustment and clutch apparatus for a rotary type lawn mower the combination of a frame having an opening therethrough, a motor operatively mounted to the frame, a shaft adapted to be rotatably driven by said motor extending through said opening in said frame, a clutch cone received on said shaft in substantially axial alignment therewith and adapted only for relative longitudinal movement, a clutch body adapted for complementary engagement with said clutch cone, spring means operatively mounted in said clutch body and adapted to bias said clutch body into engagement with said clutch cone, means engaging said clutch body adapted to move said clutch body longitudinally in relation to said shaft whereby when said clutch body is moved to its limit towards said frame the spring means are compressed thereby moving said clutch body out of engagement with said clutch cone, and cutter blade means operatively affixed to said clutch body.

7. In a clutch and blade adjustment assembly for a rotary type lawn mower the combination of a frame, a rotatable shaft passing through the frame, a clutch assembly slidably mounted for longitudinal movement on said shaft which assembly comprises a clutch cone received in longitudinal sliding non-rotatable relation on said shaft, a pilot member received in longitudinal sliding and rotatable relation on said clutch cone, a clutch body received in longitudinal sliding and non-rotatable relation on said pilot member, said clutch body adapted to engage said clutch cone in a friction clutch relationship, and spring means adapted to bias said clutch body into engagement with said clutch cone, means adapted to engage and move said clutch body out of engagement wtih said clutch cone, and cutter blade means operatively affixed to said pilot member.

8. In a clutch and blade adjustment assembly for a rotary type lawn mower the combination of a frame, a rotatable shaft passing through the frame, a clutch assembly slidably mounted for longitudinal movement on said shaft which assembly comprises a clutch cone received in longitudinal sliding non-rotatable relation on said shaft,
a pilot member received in longitudinal sliding and rotatable relation on said clutch cone,
a clutch body received in longitudinal sliding relation on said pilot member and having extending lugs adapted to engage receiving slots in said pilot member to prevent relative rotation therebetween, said clutch body adapted to engage said clutch cone in a friction clutch relationship, and
spring means adapted to bias said clutch body into engagement with said clutch cone,
means adapted to engage and move said clutch body out of engagement with said clutch cone, and
cutter blade means operatively affixed to said pilot member.

9. In a blade adjustment and clutch apparatus for a rotary type lawn mower the combination of
a frame having an opening therethrough,
a motor operatively mounted to the frame,
a shaft adapted to be rotatably driven by said motor extending through said opening in said frame,
a first member received on said shaft in substantially axial alignment therewith and adapted for relative longitudinal movement,
a second member slidably received on said shaft in substantially axial alignment therewith and capable of relative rotational and longitudinal movement, said second member adapted for complementary frictional clutching engagement with the first member,
means adapted to bias said second member and the first member into frictional clutching engagement,
means adapted to provide a braking action to said second member,
means engaging said second member adapted to move it out of frictional clutching engagement with said first member, and
cutter blade means operatively affixed to said second member.

References Cited by the Examiner
UNITED STATES PATENTS

| | | | |
|---|---|---|---|
| 1,438,457 | 12/1922 | Morton | 198—18 X |
| 2,175,383 | 10/1939 | Eason | 192—18 |
| 2,329,185 | 9/1943 | Coddington | 56—25.4 |
| 2,585,365 | 2/1952 | Allen et al. | 192—18 |
| 2,657,517 | 11/1953 | Berdan | 56—295 |
| 2,770,115 | 11/1956 | Ober | 56—295 X |
| 2,968,902 | 1/1961 | Brown | 56—25.4 |

ABRAHAM G. STONE, *Primary Examiner.*

JOE O. BOLT, *Examiner.*